(12) United States Patent
Suzuki et al.

(10) Patent No.: US 7,924,665 B2
(45) Date of Patent: Apr. 12, 2011

(54) PICKUP DEVICE AND RECORDING MEDIUM DRIVE UNIT

(75) Inventors: Jun Suzuki, Tokorozawa (JP); Yasuhiro Ohira, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 741 days.

(21) Appl. No.: 11/092,973

(22) Filed: Mar. 30, 2005

(65) Prior Publication Data

US 2005/0276171 A1 Dec. 15, 2005

(30) Foreign Application Priority Data

Mar. 30, 2004 (JP) .................. 2004-099178

(51) Int. Cl.
*G11B 7/00* (2006.01)
(52) U.S. Cl. ................. 369/44.15; 720/683
(58) Field of Classification Search ............ 369/13, 369/44.1; 359/824
See application file for complete search history.

(56) References Cited

U.S. PATENT DOCUMENTS

| | | | | |
|---|---|---|---|---|
| 4,664,476 A * | 5/1987 | Kasuga | ............ | 359/814 |
| 4,838,649 A * | 6/1989 | Ichikawa et al. | ............ | 359/813 |
| 4,998,802 A * | 3/1991 | Kasuga et al. | ............ | 359/814 |
| 5,044,729 A * | 9/1991 | Tomita et al. | ............ | 359/824 |
| 5,881,033 A * | 3/1999 | Murakami et al. | ......... | 369/44.14 |
| 6,421,191 B1 * | 7/2002 | Nagasaka et al. | ............ | 359/824 |
| 6,504,813 B2 * | 1/2003 | Suzuki et al. | ............ | 720/683 |
| 7,199,949 B2 * | 4/2007 | Haruguchi et al. | ............ | 359/814 |
| 2002/0054559 A1 * | 5/2002 | Choi | ............ | 369/244 |
| 2003/0234990 A1 * | 12/2003 | Akanuma | ............ | 359/819 |
| 2005/0141360 A1 * | 6/2005 | Han | ............ | 369/44.15 |

FOREIGN PATENT DOCUMENTS

| | | |
|---|---|---|
| JP | 2-60450 | 2/1990 |
| JP | 7-93779 | 4/1995 |
| JP | 7-240031 | 9/1995 |
| JP | 2003-045720 | 2/2003 |

OTHER PUBLICATIONS

Office Action issued for the corresponding Japanese patent application No. 2004-099178 on Dec. 9, 2008.

* cited by examiner

*Primary Examiner* — William J Klimowicz
*Assistant Examiner* — Mark L Fischer
(74) *Attorney, Agent, or Firm* — Kratz, Quintos & Hanson, LLP

(57) ABSTRACT

The pickup device includes: a fixed portion 11, a movable portion 12 movable in a tracking direction and a focus direction; linear resilient members 13A through 13D for connecting the fixed portion 11 and the movable portion 12; a coil 21 provided on the lateral side of the movable portion 12; and a flux providing unit 22 for providing a magnetic flux generating a translational force for driving a portion different from the center of gravity O of the movable portion 12 in the tracking direction in association with the coil 21 and a rotational force for rotating the movable portion 12 in a plane orthogonal to the focus direction, the flux providing unit 22 having an arrangement in which a torque generated by driving the portion different from the center of gravity with the translational force is counteracted by the rotational force.

8 Claims, 10 Drawing Sheets

PICKUP DEVICE AND RECORDING MEDIUM DRIVE UNIT

BACKGROUND OF THE INVENTION

1. Field of the Invention

The present invention relates to a pickup device and a recording medium drive unit.

2. Description of the Related Art

Conventionally, there has been known a pickup device as a mechanism for recording on and/or reproducing from an optical recording medium. There are various arrangements as the pickup device. Recently, among the various types of pickup devices, a development of a pickup device capable of recording on and/or reproducing from an optical recording medium at higher speed has been promoted.

As an example of those pickup devices, there has been known an arrangement where four linear resilient members connect a lens holder supporting an objective lens and a base, the resilient members swingably supporting the lens holder in a focus direction and in a tracking direction to drive the lens holder.

As a conventional technology for driving the lens holder in such pickup device, an arrangement has been known, in which a printed coil substrate is attached to a lateral side of the lens holder and a magnet is provided at a position away from the printed coil substrate by a predetermined distance (see, for instance, Japanese Laid-Open Patent Publication 2003-45720).

FIGS. 1 to 3 schematically show conventional arrangements.

In FIGS. 1, 2A and 2B, a lens holder 101 supports an objective lens 102, which is adapted to be movable in a tracking direction T in a plane orthogonal to an optical axis of the objective lens 102. A printed coil substrate 103 is attached on a lateral side of the lens holder 101, and a magnet 104 is provided at a position away from the printed coil substrate 103. In the magnet 104, a south pole and a north pole are adjacent to each other.

In the arrangement, when a current is applied to the printed coil substrate 103, currents in inversed directions are applied to both lateral portions 103A, 103B of the printed coil substrate 103, where a driving force Fa is generated between the lateral portion 103A and the opposing south pole and a driving force Fb is generated between the lateral portion 103B and the opposing north pole.

In the magnet 104, since a magnetic field line Mo generated from the north pole toward the south pole is curved, the driving force Fa heads to the lower right in FIG. 1, and the driving force Fb heads to the upper right in FIG. 1.

In the driving forces Fa, Fb, components of forces FaT, FbT along the tracking direction T act effectively as driving forces, the center of the driving forces in the tracking direction is in the vicinity of the lateral sides of the lens holder 101. On the other hand, the center of gravity O of the lens holder 101 substantially coincides with the optical axis of the objective lens 102, so that the center of driving force and the center of gravity O are away from each other in a plane orthogonal to the optical axis of the objective lens 102.

Thus, when the lens holder 101 is moved in the tracking direction T, a torque NT acts around an axis passing through the center of gravity O of the lens holder 101 and parallel to the optical axis of the objective lens 102 in a counterclockwise direction in FIG. 1 due to the components of forces FaT, FbT of the driving forces Fa, Fb. Further, a torque NU also acts in the counterclockwise direction as the torque NT due to components of forces FaU, FbU orthogonal to the components of forces FaT, FbT of the driving forces Fa, Fb.

Since the torques NT, NU act on the lens holder 101, an unwanted rotational resonance is generated in the lens holder 101.

To prevent the inconvenience described above, in the conventional technology, the printed coil substrates 103 are attached to both lateral sides opposing each other of the lens holder 101 in such a manner the printed coil substrates 103 are disposed symmetrically with respect to the center of gravity of the lens holder 101 as shown in FIG. 3.

With such arrangement, since the printed coil substrates 103 are disposed on symmetrical positions with respect to the center of gravity O of the lens holder 101, torques No (torque NT+torque NU) are mutually counteracted, and thereby the center of driving force and the center of gravity of the lens holder 101 coincide with each other.

In the conventional pickup device, since the printed coil substrates 103 disposed on opposed positions about the center of gravity O of the lens holder 101 prevent the unwanted rotational resonance generated in the lens holder 101, reduction in thickness, size, and weight of the device has been limited.

When the printed coil substrate 103 is disposed only on one side of the lens holder 101 to achieve reduction in thickness or the like of the device, a rotational force is generated in the lens holder 101 as described above, so that movement of the lens holder 101 cannot be controlled with high accuracy.

SUMMARY OF THE INVENTION

An object of the present invention is to provide a pickup device and a recording medium drive unit allowing reduction in thickness, size, and weight of the devices and capable of moving a movable portion with high accuracy.

A pickup device according to an aspect of the present invention includes: a fixed portion; a movable portion holding an objective lens and adapted to move in at least one direction of a focus direction along an optical axis of a light beam incident on the objective lens and a tracking direction substantially orthogonal to the focus direction; a linear resilient member with ends connected to the movable portion and the fixed portion; a coil provided on a lateral side of the movable portion; and a flux providing unit for providing a magnetic flux that generates a translational force for driving a portion different from the center of gravity of the movable portion along the one direction in association with the coil and a rotational force for rotating the movable portion, the flux providing unit counteracting by the rotational force a torque generated by the translational force in driving the portion different from the center of gravity.

A recording medium drive unit according to another aspect of the present invention includes the above-described pickup device of the present invention.

DETAILED DESCRIPTION OF PREFERRED EMBODIMENT(S)

A first embodiment of the present invention will be described below with reference to the attached drawings.

[Arrangement of Pickup Device]

Figure 1:
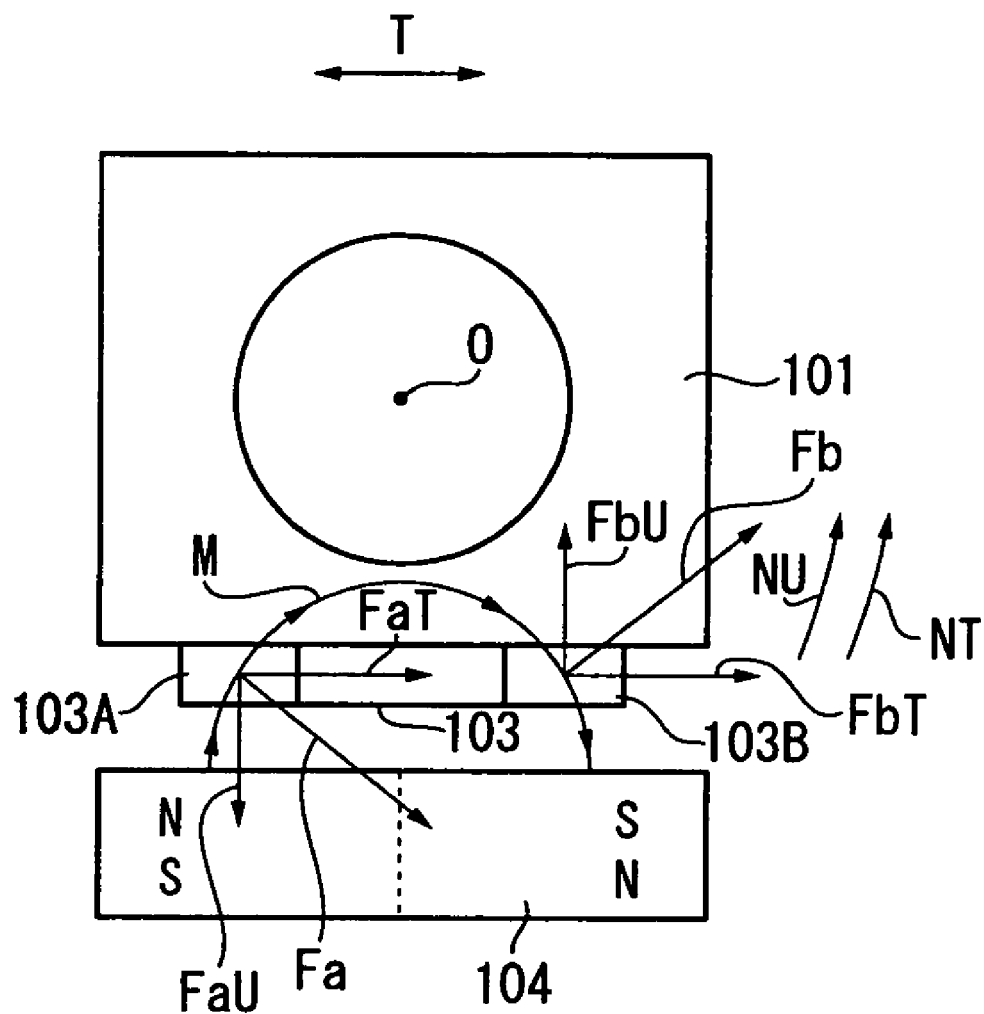
FIG. 1 is a schematic view illustrating a problem of a related art.
Figure 2A:
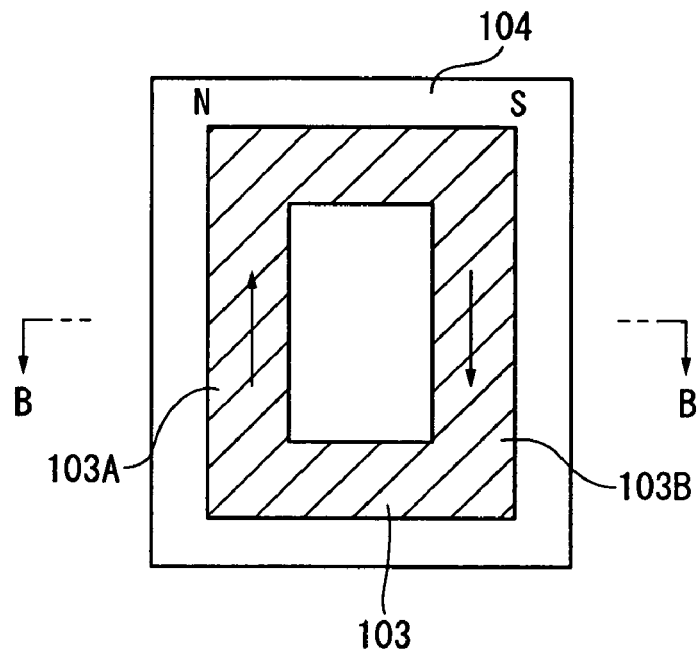
FIG. 2A is a front elevation showing a relationship between a printed coil substrate and a magnet of the related art.
Figure 2B:
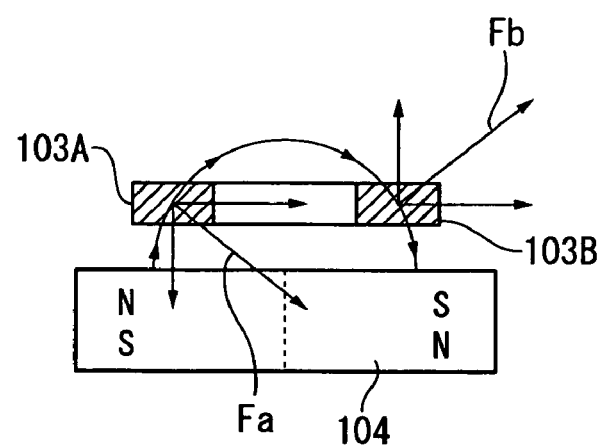
FIG. 2B is a cross section taken along the line B-B, which is viewed in the arrow direction in FIG. 2A.
Figure 3:
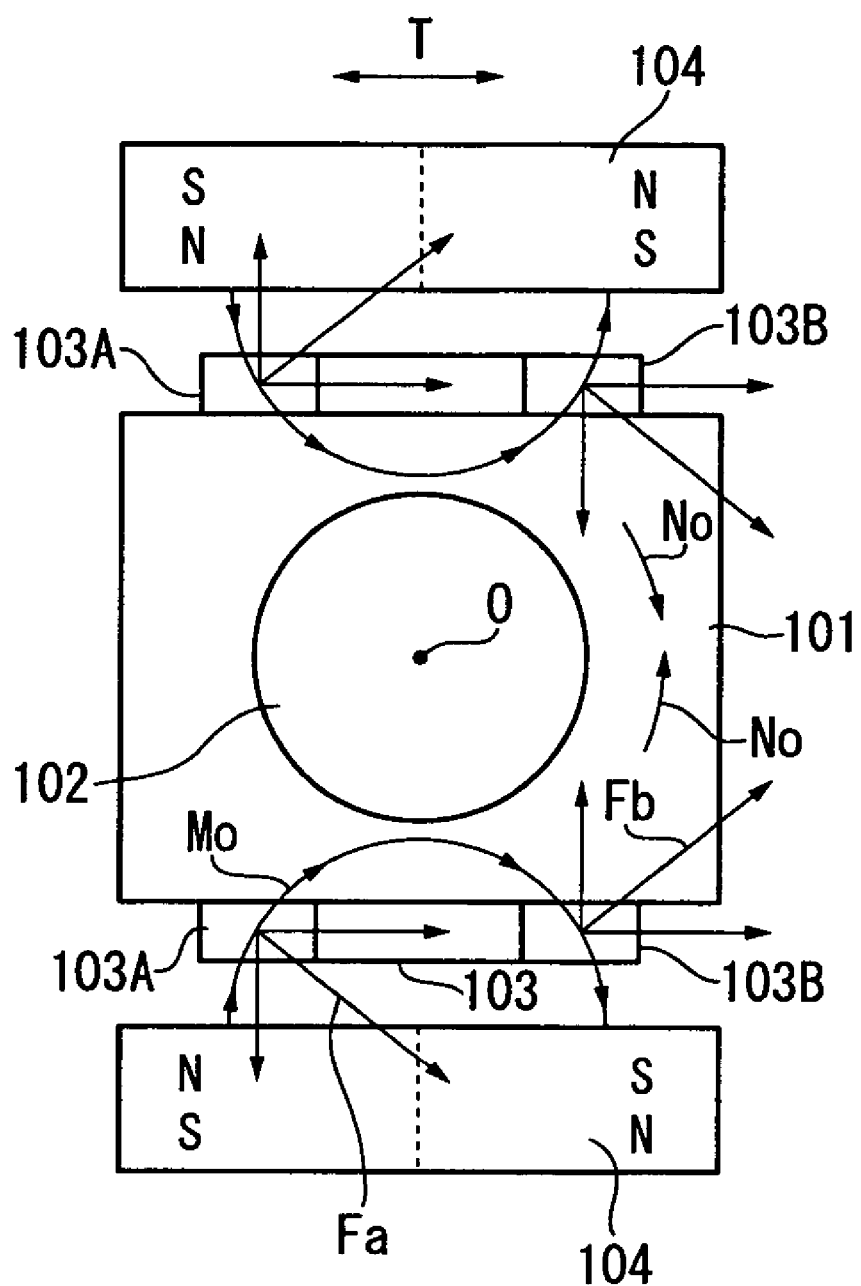
FIG. 3 is a schematic illustration showing the arrangement of a pickup device of the related art.
Figure 4A:
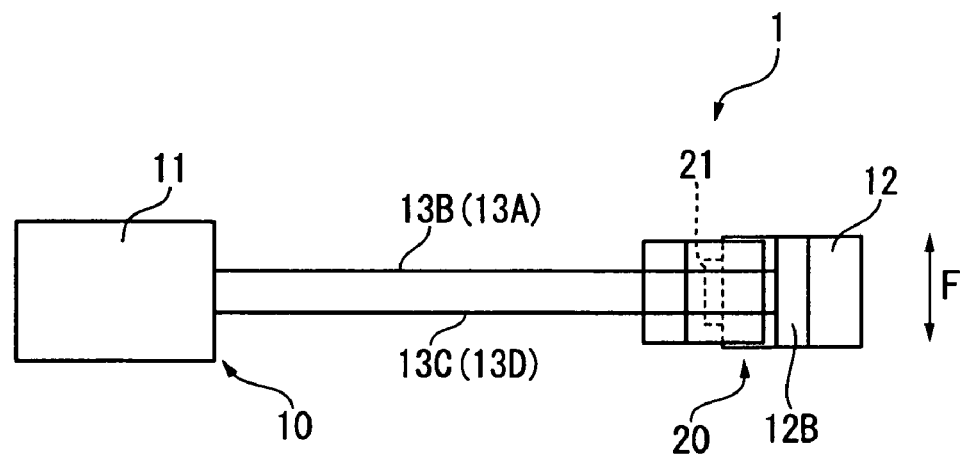
FIG. 4A is a schematic illustration of an entire part of a pickup device viewed in a tracking direction according to a first embodiment of the present invention.
Figure 4B:
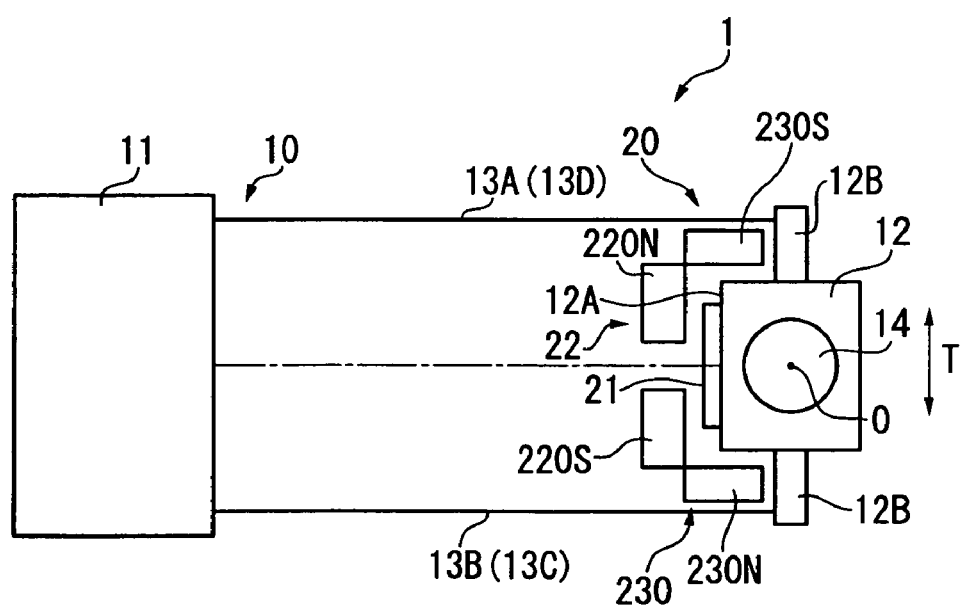
FIG. 4B is a schematic illustration of the entire part of the pickup device viewed in a focus direction according to the first embodiment of the present invention.

In FIGS. 4A and 4B, a pickup device 1 is a device for recording on and/or reproduced from an optical disc (an optical recording medium) such as CD, DVD and Blu-ray disc. Thus, the pickup device 1 is, for instance, incorporated in a drive device for recording on and/or reproduced from these optical recording media.

The pickup device 1 includes a pickup actuator 10 and a drive mechanism 20 for driving the pickup actuator 10.

The pickup actuator 10 includes an actuator base (not shown), a suspension base 11 as a fixed portion, a lens holder 12 as a movable portion and four suspensions 13A through 13D as linear resilient members connecting the suspension base 11 and the lens holder 12.

A laser source (not shown) is attached to the actuator base. A laser beam irradiated from the laser source passes through an optical path formed by an optical system disposed in the actuator base to reach an objective lens 14 supported by the lens holder 12. An optical disc (not shown) is placed on the upper side of the objective lens 14 which condenses the laser beam on an information recording surface of the optical disc.

The suspensions 13A through 13D connect the suspension base 11 and the lens holder 12. As a material for the suspensions 13A through 13D, it is preferable to use a material having high strength and durable against strong bending stress as a material for spring, while having high fatigue resistance against repeated actions such as, for instance, beryllium copper. In addition to beryllium copper, other metallic materials such as phosphor bronze alloy having high strength and high fatigue resistance can be used as a substitute material.

Although the suspensions 13A through 13D are parallel to one another as viewed in the tracking direction as shown in FIG. 4A as well as parallel to one another as viewed in the focus direction as shown in FIG. 4B, the adjacent suspensions 13A and 13B may also be disposed in truncated chevron shape in the present embodiment.

The lens holder 12 is swingably connected to the suspension base 11 by the four suspensions 13A through 13D via supporters 12B disposed on both sides in the tracking direction of the lens holder 12.

The lens holder 12 has a hollow structure molded with a synthetic resin, which supports the objective lens 14 at the center thereof. The center of gravity O of the lens holder 12 including the objective lens 14 is positioned on the optical axis of the objective lens 14.

The lens holder 12 is molded simultaneously with the suspension base 11 by an insert molding where flat plate portions (not shown) of the suspensions 13A through 13D are placed in a metal mold and the synthetic resin is injected.

Figure 5:
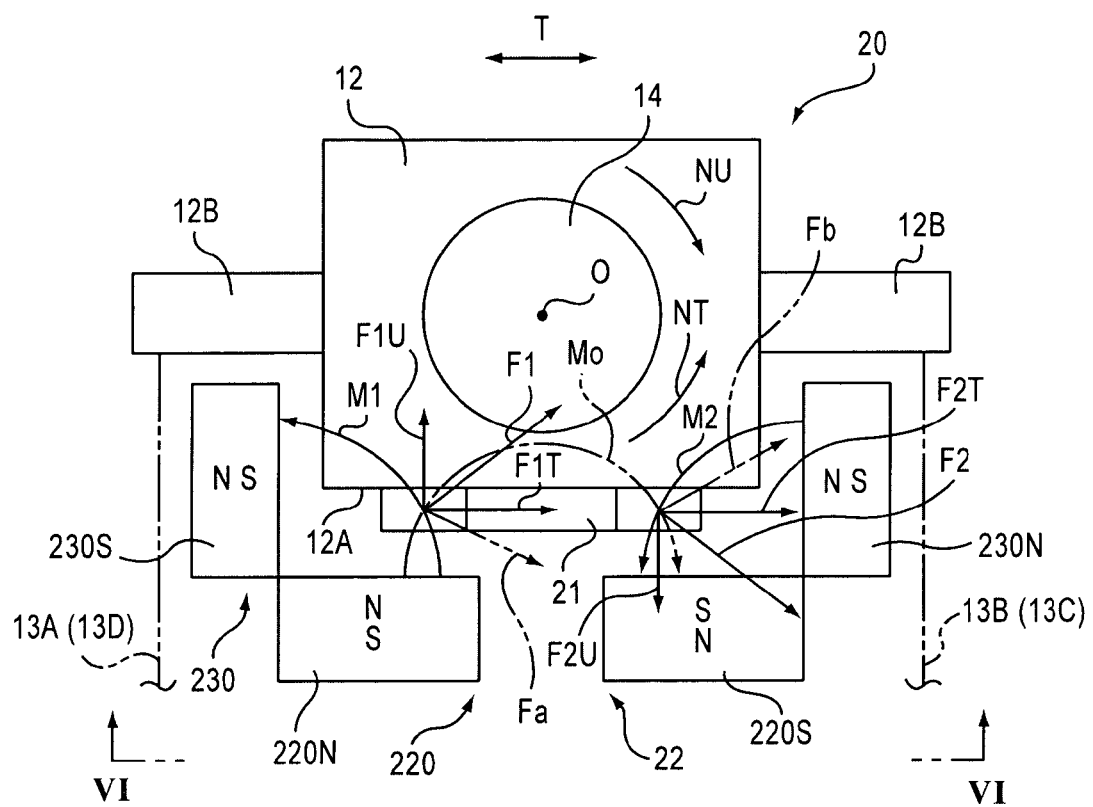
FIG. 5 is a schematic illustration of a principal part of the first embodiment viewed in the focus direction.
Figure 6:
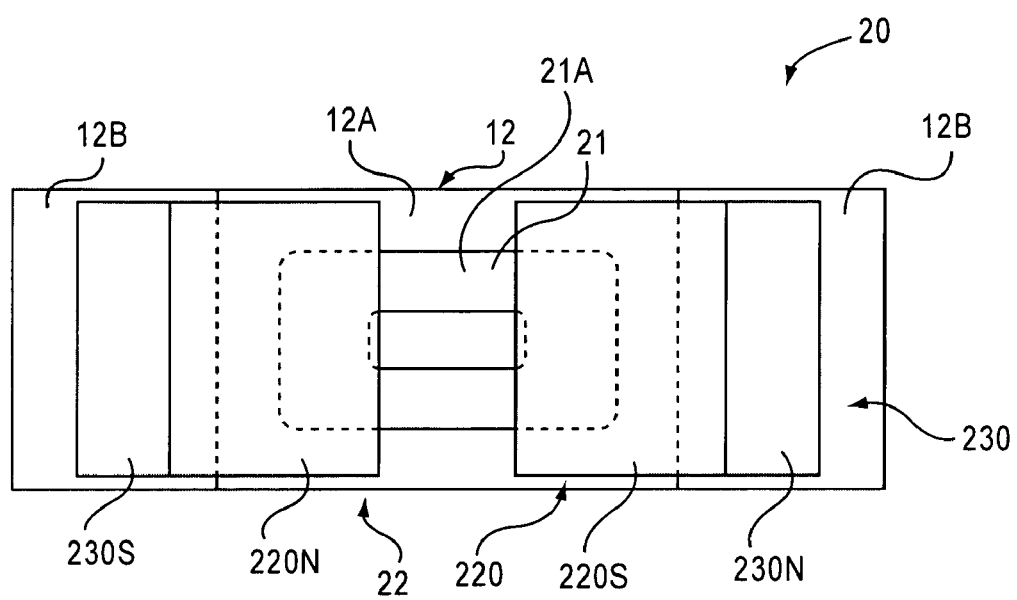
FIG. 6 is an illustration viewed in the arrow direction along the line VI-VI in FIG. 5.

FIGS. 5 and 6 show the detailed arrangement of the drive mechanism 20. FIG. 5 is a schematic illustration of the drive mechanism 20 viewed in the focus direction while FIG. 6 is an illustration viewed in the arrow direction along the line VI-VI in FIG. 5.

In the drawings, the drive mechanism 20 includes: a printed coil substrate 21 as a coil attached to a coil installation surface 12A of the lens holder 12 facing the suspension base 11 by bonding, soldering or the like; and a flux providing unit 22 for generating a magnetic flux to drive the lens holder 12 in association with the printed coil substrate 21.

The printed coil substrate 21 includes a ringed tracking coil 21A for driving the lens holder 12 in the tracking direction and a focus coil (not shown) for driving the lens holder 12 in the focus direction. Although the tracking coil 21A is provided on one part in FIG. 6, the tracking coils 21A can be provided on two parts. In addition, if movement of the lens holder 12 in the focus direction is not required, the focus coil may not be provided.

One ends of coil terminals (not shown) are connected to the coils, while the other ends of the coil terminals receive power from a power source (not shown) via the suspensions 13A through 13D.

The flux providing unit 22 includes a first magnet 220 disposed opposite to the printed coil substrate 21 and provided with a predetermined magnetizing pattern and a second magnet 230 disposed adjacent to the first magnet 220 and provided with a predetermined magnetizing pattern.

The first magnet 220 has a first pole 220S and a second pole 220N positioned away from each other by a predetermined distance. On the first pole 220S and the second pole 220N, opposing surfaces respectively opposing the coil installation surface 12A of the lens holder 12 are formed, the opposing surfaces being substantially in parallel to a plane of the printed coil substrate 21. The first pole 220S has a south pole on a side opposing the printed coil substrate 21 and a north pole on the other side. The second pole 220N has a north pole on a side opposing the printed coil substrate 21 and a south pole on the other side.

The first pole 220S and the second pole 220N generate a magnetic flux (magnetic field line Mo) generating translational force for driving a portion different from the center of gravity O of the lens holder 12 (more specifically, a portion in the vicinity of the coil installation surface 12A of the lens holder 12 and on a middle position of the printed coil substrate 21) in the tracking direction T while generating rotational force (driving forces Fa, Fb) for rotating the lens holder 12 in a plane orthogonal to the focus direction.

The second magnet 230 has a first pole 230S disposed adjacent to the second pole 220N of the first magnet 220 and a second pole 230N disposed adjacent to the first pole 220S of the first magnet 220.

Both the first magnet 220 and the second magnet 230 are permanent magnets.

The first pole 230S of the second magnet 230 is arranged in such a manner that a plane thereof is orthogonal to a plane of the second pole 220N of the first magnet 220 while being parallel to a plane orthogonal to the coil installation surface 12A of the lens holder 12. The first pole 230S has a south pole on a side opposing the lens holder 12 and a north pole on the other side. Since the first pole 230S and the second pole 220N are disposed in proximity to each other, a magnetic field line M1 curved from the second pole 220N toward the first pole 230S is generated.

The second pole 230N of the second magnet 230 is arranged in such a manner a plane thereof is orthogonal to a plane of the first pole 220S of the first magnet 220 while being parallel to a plane orthogonal to the coil installation surface 12A of the lens holder 12. The second pole 230N has a north pole on a side opposing the lens holder 12 and a south pole on the other side. Since the first pole 220S and the second pole 230N are disposed in proximity to each other, a magnetic field line M2 curved from the second pole 230N toward the first pole 220S is generated.

Thus, a direction of the magnetic flux provided by the flux providing unit 22 is changed from the magnetic field line Mo to the magnetic field lines M1 and M2, which counteracts the driving force in a direction rotating the lens holder 12.

In other words, the driving forces F1, F2 can be respectively divided into components of forces F1T, F2T in the tracking direction T and components of forces F1U, F2U orthogonal to the components of forces F1T, F2T, so that a torque NT acts counterclockwise around the center of gravity O of the lens holder 12 due to the components of forces F1T, F2T in the tracking direction. On the other hand, a torque NU acts clockwise around the center of gravity O of the lens holder 12 due to the components of forces F1U and F2U of the driving forces F1, F2. The torques NT, NU are counteracted by adjusting, for instance, a distance between the center of gravity O of the lens holder 12 and the coil installation surface 12A. The drawing shows that the directions of the driving forces F1, F2 are non-parallel and cross with each, which is related to their respective torques NT, NU counteracting one another. The drawing also shows that magnetically-driven portions are located on a same side relative to a segment passing through the center of gravity O and extending parallel to a driving direction.

(The drawing shows that the flux providing unit 22 can also be divided into first and second permanent magnet structures which are mirror-image symmetrical with one another, across a plane that is perpendicular to the tracking direction T and that contains the center of gravity O of the movable lens holder 12 (such a plane would appear as a vertical line in FIG. 5, and also in FIG. 7 that is discussed below). The first permanent magnet structure would include magnets with the poles 230S and 220N on the left-hand side in FIG. 5, and the second permanent magnet structure would include magnets with the poles 220S and 230N on the right-hand side in FIG. 5. These two permanent magnet structures are north-south reversed in polarity relative to one another, and are separated by a gap (not numbered). Each one of these first and the second permanent magnet structures includes one north pole and one south pole facing toward the coil 21A, so that together they comprise a magnetic quadrupole of alternating polarities facing the coil.)

In the first embodiment, in order to drive the lens holder 12 in the focus direction, a printed coil substrate only having a focus coil may be disposed on the lens holder 12 on a side opposite to the coil installation surface 12A and a magnet for driving in the focus direction may be disposed on a position opposing the printed coil substrate.

[Advantages of Pickup Device]

The pickup device 1 in the first embodiment includes: the suspension base 11, the lens holder 12 supporting the objective lens 14 and adapted to move in the tracking direction and the focus direction; the four suspensions 13A through 13D for connecting the suspension base 11 and the lens holder 12; the printed coil substrate 21 provided on the lateral side of the lens holder 12; and the flux providing unit 22 providing the magnetic flux generating the translational force for driving a portion different from the center of gravity O of the lens holder 12 in the tracking direction in association with the printed coil substrate 21 and a rotational force for rotating the lens holder 12 in a plane orthogonal to the focus direction, the flux providing unit 22 having an arrangement in which the torque generated by driving the portion different from the center of gravity with the translational force is counteracted by the rotational force Thus, the printed coil substrate 21 does not have to be attached to both sides of the lens holder 12 for balancing in driving in the tracking direction, which enables the printed coil substrate 21 to be attached only to one side, thereby reducing thickness, size and weight of the device. Further, by attaching the printed coil substrate 21 only to one side of the lens holder 12, even when the portion different from the center of gravity O is driven in the tracking direction and the torque acts on the lens holder 12, a torque counteracting the torque can be generated by the flux providing unit 22, so that the lens holder 12 can be moved with high accuracy.

(2) The flux providing unit 22 includes: the first magnet 220 that is disposed opposite to the printed coil substrate 21 and that has the first pole 220S and the second pole 220N having different polarity and positioned away from each other; and a second magnet 230 disposed adjacent to the first magnet 220, the second magnet 230 having the first pole 230S disposed adjacent to the second pole 220N of the first magnet 220 and the second pole 230N disposed adjacent to the first pole 220S of the first magnet 220. Thus, with a simple arrangement where magnets each having a pair of the first pole and the second pole are disposed adjacent to each other, advantages as described above can be achieved.

(3) The first magnet 220 has the opposing surface opposing the coil installation surface 12A on which the printed coil substrate 21 of the lens holder 12 is installed, while the second magnet 230 has the opposing surface opposing the plane orthogonal to the coil installation surface 12A of the lens holder 12. Since the first magnet 220 and the second magnet 230 are disposed in such a manner that the opposing surfaces thereof are orthogonal to each other, the direction of the magnetic flux generated in the first magnet 220 can be easily changed by the second magnet 230, and thereby unwanted rotation of the lens holder 12 can be securely prevented, so that the lens holder 12 can be moved highly accurately.

(4) In the first embodiment, when the lens holder 12 is driven in the tracking direction, the torque of the lens holder 12 in a plane orthogonal to the focus direction is counteracted. Thus, the first magnet 220 and the second magnet 230 can be aligned in a plane orthogonal to the focus direction for counteracting of the torque. Since the magnets can be aligned in a single plane having relatively sufficient space, the device can be downsized without difficulty.

(5) Since the recording medium drive unit of the first embodiment includes the pickup device 1 with the above arrangement, the recording medium drive unit providing the advantages described above can be obtained.

Next, a second embodiment of the present invention will be described with reference to FIG. 7. The arrangement of the second embodiment is the same as that of the first embodiment except the alignment of the second magnet 230. Incidentally, the same components as those in the first embodiment are indicated by the same reference symbols or numerals for omitting or simplifying the detailed description thereof.

Figure 7:
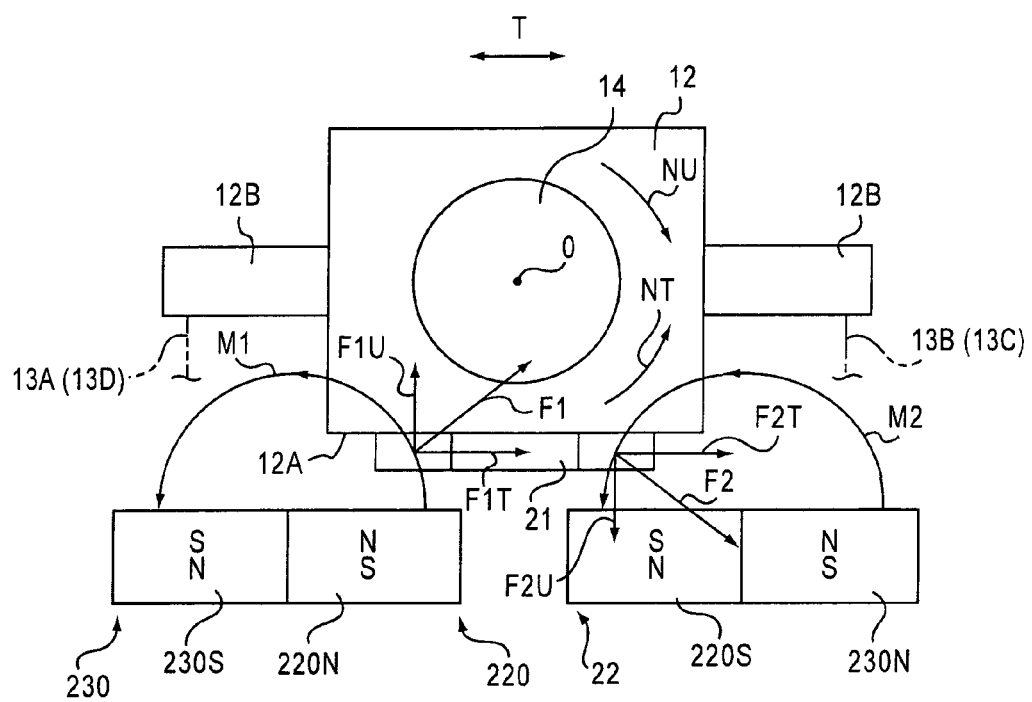
FIG. 7 is a schematic illustration showing a second embodiment of the present invention, which corresponds to FIG. 5.

FIG. 7 illustrates a principal part of the second embodiment, and is a schematic illustration of the drive mechanism 20 viewed in the focus direction as in FIG. 5.

In FIG. 7, the drive mechanism 20 of the second embodiment includes the printed coil substrate 21 and the flux providing unit 22.

The flux providing unit 22 has the first magnet 220 and the second magnet 230.

As in the first embodiment, the first magnet 220 has the first pole 220S and the second pole 220N positioned away from each other at a predetermined space. The first pole 220S and the second pole 220N each have an opposing surface opposing the coil installation surface 12A of the lens holder 12, and the opposing surfaces and a plane of the printed coil substrate 21 are substantially in parallel to each other.

The second magnet 230 has a second pole 230N disposed adjacent to the south first pole 220S of the first magnet 220 and the first pole 230S disposed adjacent to the second pole 220N of the first magnet 220. The first pole 230S and the second pole 230N have opposing surfaces opposing the lens holder 12, the opposing surfaces disposed so as to be substantially flush with the opposing surfaces of the first magnet 220, which is different from the first embodiment.

In the second embodiment, the same advantages as (1), (2), (4) and (5) of the first embodiment can be obtained.

Modification of Embodiment

The recording medium drive unit of the present invention is not limited to the embodiments described above, but includes various modifications as long as an object of the present invention can be achieved.

For instance, in the embodiments described above, the torque of the lens holder 12 is counteracted in a plane orthogonal to the focus direction in driving the lens holder 12 in the tracking direction, however in the present invention, the toque of the lens holder 12 may be counteracted in a plane orthogonal to the tracking direction in driving the lens holder 12 in the focus direction.

In the present invention, the printed coil substrate 21 may be attached to a side opposite to the coil installation surface 12A instead of attaching the printed coil substrate 21 to the coil installation surface 12A of the lens holder 12 opposing the side of suspension base 11. In such case, the first magnet 220 may be disposed opposite to the printed coil substrate 21 and the second magnet may be disposed adjacent to the first magnet 220.

Further, in the respective embodiments described above, the first magnet 220 and the second magnet 230 are permanent magnets, but the magnets may be electromagnets.

In the embodiments described above, four suspensions 13A through 13D are used, but in the present invention, the number of suspensions 13A through 13D is not limited but may be five, six or more, as king as the number is four or more.

Figure 8:
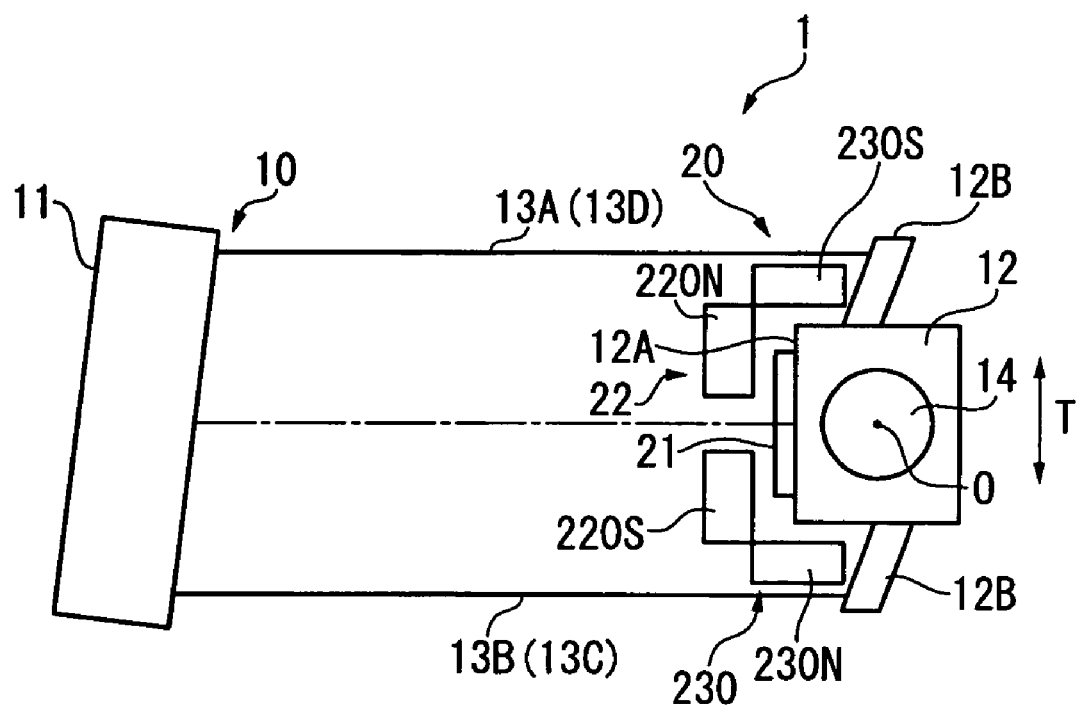
FIG. 8 is a schematic illustration showing a modification of the present invention, which corresponds to FIG. 4B.

In the embodiments described above, connecting portions of the suspensions 13A through 13D are positioned on planes including the focus direction and the tracking direction, but in the present invention, connecting portions of the suspensions 13A through 13D may be offset, including a state where the connecting portions are not on the above-described planes. For instance, as shown in FIG. 8, segment lines connecting the connecting portions of the respective suspensions 13A through 13D on the supporters 12B of the lens holder 12 are not parallel to a plane of the printed coil substrate 21, and likewise, segment lines connecting the connecting portions of the suspensions 13A through 13D on the suspension base 11 are not parallel to the plane of the printed coil substrate 21.

Figure 9:
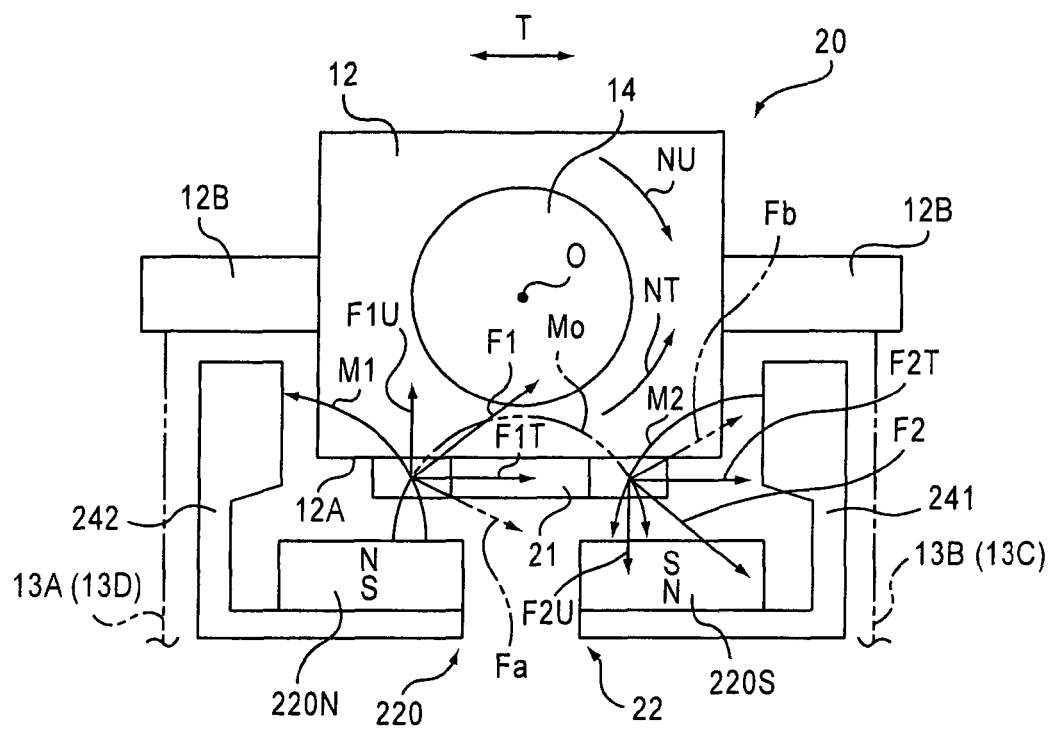
FIG. 9 is a schematic illustration showing another modification of the present invention, which corresponds to FIG. 5.
Figure 10:
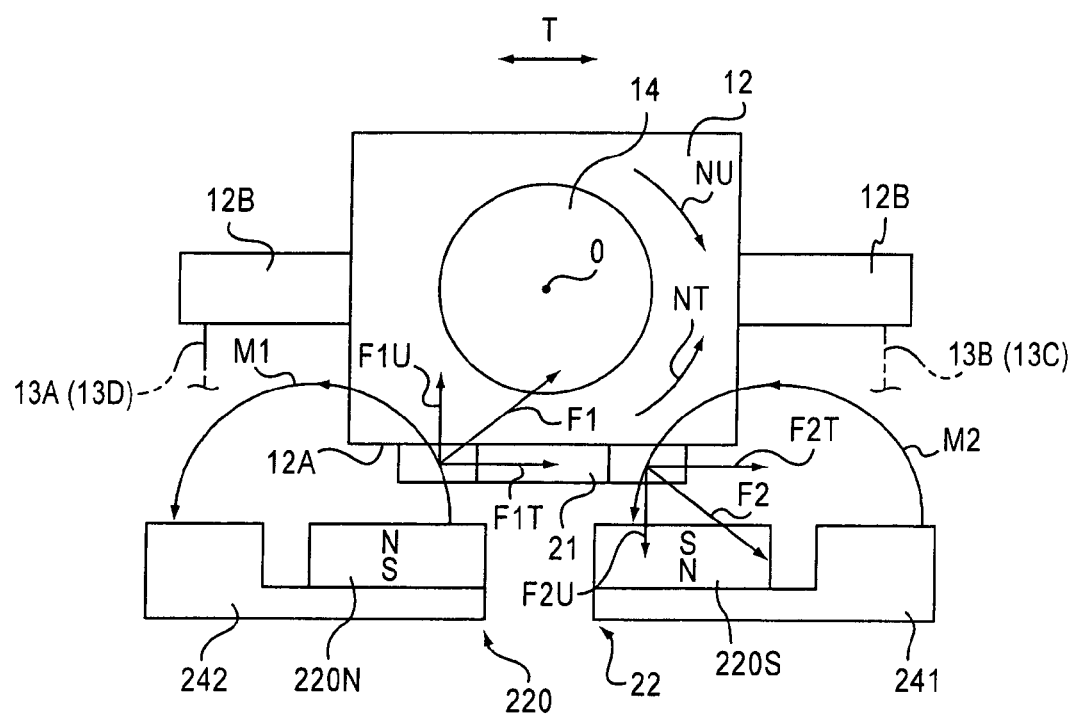
FIG. 10 is a schematic illustration showing still another modification of the present invention, which corresponds to FIG. 7.

In the present invention, the flux providing unit 22 may include the first magnet 220 and a yoke disposed adjacent to the first magnet 220 as shown in FIGS. 9 and 10. The yoke includes: a first yoke portion 241 of which a second pole having a polarity (north pole on the lens holder 12 side) opposite to the first pole 220S is disposed adjacent to the first pole 220S of the first magnet 220 opposing the printed coil substrate 21; and a second yoke portion 242 of which a first pole having a polarity (south pole on the lens holder 12 side) opposite to the second pole 220N is disposed adjacent to the second pole 220N of the first magnet 220 opposing the printed coil substrate 21. With the arrangement, the same advantages as those of the embodiments described above can be obtained.

Advantages of Embodiment

The pickup device 1 in the above embodiments includes: the suspension base 11, the lens holder 12 supporting the objective lens 14 and adapted to move in at least one direction of the tracking direction along the optical axis of the beam incident on the objective lens and the focus direction; the suspensions 13A through 13D for connecting the suspension base 11 and the lens holder 12; the printed coil substrate 21 provided on the lateral side of the lens holder 12; and the flux providing unit 22 providing the magnetic flux generating the translational force for driving a portion different from the center of gravity O of the lens holder 12 in the tracking direction in association with the printed coil substrate 21 and a rotational force for rotating the lens holder 12 in a plane orthogonal to the focus direction, the flux providing unit 22 having an arrangement in which the torque generated by driving a position different from the center of gravity with the translational force is counteracted by the rotational force. Therefore, the printed coil substrate 21 does not have to be attached to the both sides of the lens holder 12 for balancing in driving in the one direction, and the printed coil substrate 21 can be attached to one side of the lens holder, so that the device can be reduced in thickness, size and weight. Further, even when the portion different from the center of gravity O of the lens holder 12 is driven in the tracking direction and a torque acts on the lens holder 12, a torque counteracting the torque can be generated by the flux providing unit 22, so that the lens holder 12 can be moved with high accuracy.

The priority application Number JP2004-099178 upon which this patent application is based is hereby incorporated by reference.

What is claimed is:

1. A pickup device comprising:
    a fixed portion;
    a movable portion holding an objective lens and adapted to move in at least one direction of a focus direction along an optical axis of a light beam incident on the objective lens and a tracking direction substantially orthogonal to the focus direction;
    a linear resilient member with ends connected to the movable portion and the fixed portion;
    a coil, wherein only one lateral side of the movable portion is attached to the coil; and
    a flux providing unit providing a magnetic flux that applies respective driving forces to a plurality of driven coil portions located at respective positions located away from a center of gravity of the movable portion, the directions of the driving forces being non-parallel and crossing with each other such that respective torques generated on the movable portion by driving the driven coil portions counteract one another;

wherein the plurality of driven coil portions are located on the same side of a plane passing through the center of gravity of the movable portion and extending, parallel to the one lateral side, in a direction in which the movable portion is driven; and wherein the flux providing unit includes:

a first magnet having a first pole and a second pole with different polarities and disposed opposite to the coil, the first magnet being spaced apart from the coil; and a second magnet disposed adjacent to the first magnet in such a manner that a second pole thereof is positioned close to the first pole of the first magnet opposing the coil and a first pole thereof is positioned close to the second pole of the first magnet opposing the coil, the coil including a tracking coil and being provided on the one lateral side of the movable portion, facing the fixed portion;

wherein the first magnet has a first opposing surface facing the one lateral side of the movable portion and the second magnet has a second opposing surface facing a side of the movable portion that is perpendicular to the one lateral side of the movable portion, and wherein the first magnet and the second magnet are disposed with the first opposing surface and the second opposing surface being perpendicular to each other.

2. The pickup device according to claim 1, wherein
the movable portion is moved in the tracking direction, and
the flux provided by the flux providing unit causes the torques generated on the movable portion in a plane orthogonal to the focus direction.

3. The pickup device according to claim 1, wherein the coil is not provided on an opposite lateral side of the movable portion that is opposite to the one lateral side.

4. The pickup device according to claim 1, wherein:
the flux providing unit comprises first and second permanent magnet structures which are mirror-image symmetrical with one another across a plane that is perpendicular to the tracking direction and that contains the center of gravity of the movable portion;
the first and second permanent magnet structures are separated by a gap;
the first and the second permanent magnet structures are north-south reversed in polarity relative to one another; and
each one of the first and the second permanent magnet structures includes one north pole and one south pole facing toward the coil.

5. A recording medium drive unit including a pickup device,
wherein the pickup device comprises:
a fixed portion;
a movable portion holding an objective lens and adapted to move in at least one direction of a focus direction along an optical axis of a light beam incident on the objective lens and a tracking direction substantially orthogonal to the focus direction;
a linear resilient member with ends connected to the movable portion and the fixed portion;
a coil, wherein only one lateral side of the movable portion is attached to the coil; and a flux providing unit providing a magnetic flux that generates respective driving forces on a plurality of driven coil portions positioned away from a center of gravity of the movable portion, the directions of the driving forces being non-parallel and crossing with each other such that respective torques generated on the movable portion by driving the driven coil portions counteract one another;

wherein the plurality of driven coil portions are located on the same side of a plane passing through the center of gravity of the movable portion and extending, parallel to the one lateral side, in a direction in which the movable portion is driven; and wherein the flux providing unit includes:

a first magnet having a first pole and a second pole with different polarities and disposed opposite to the coil, the first magnet being spaced apart from the coil; and a second magnet disposed adjacent to the first magnet in such a manner that a second pole thereof is positioned close to the first pole of the first magnet opposing the coil and a first pole thereof is positioned close to the second pole of the first magnet opposing the coil, the coil including a tracking coil and being provided on the one lateral side of the movable portion, facing the fixed portion;

wherein the first magnet has a first opposing surface facing the one lateral side of the movable portion and the second magnet has a second opposing surface facing a side of the movable portion that is perpendicular to the one lateral side of the movable portion, and wherein the first magnet and the second magnet are disposed with the first opposing surface and the second opposing surface being perpendicular to each other.

6. The recording medium driving unit according to claim 5,
the movable portion is moved in the tracking direction, and
the flux provided by the flux providing unit causes the torques generated on the movable portion in a plane orthogonal to the focus direction.

7. A pickup device comprising:
a fixed portion;
a movable portion holding an objective lens and adapted to move in at least one direction of a focus direction along an optical axis of a light beam incident on the objective lens and a tracking direction substantially orthogonal to the focus direction;
a linear resilient member with ends connected to the movable portion and the fixed portion;
a coil, wherein only one lateral side of the movable portion is attached to the coil; and
a flux providing unit providing a magnetic flux that applies respective driving forces to a plurality of driven coil portions located at respective positions located away from a center of gravity of the movable portion,
the directions of the driving forces being non-parallel and crossing with each other such that respective torques generated on the movable portion by driving the driven coil portions counteract one another;
wherein the plurality of driven coil portions are located on the same side of a plane passing through the center of gravity of the movable portion and extending, parallel to the one lateral side, in a direction in which the movable portion is driven; and
wherein the flux providing unit includes:
a first magnet having a first pole and a second pole with different polarities, the first magnet facing the coil; and
a yoke disposed adjacent to the first magnet, the yoke including: a first yoke portion in which a second pole thereof with a polarity opposite to the first pole of the first magnet is positioned close to the first pole of the first magnet opposing the coil; and a second yoke portion in which a first pole thereof with a polarity opposite to the second pole of the first magnet is positioned close to the second pole of the first magnet opposing the coil, wherein the first magnet has a first opposing surface facing the one lateral side of the movable portion and the yoke has a second opposing surface facing a side of the movable portion that is perpendicular to the one lateral side of the movable portion, and wherein the first magnet and the yoke are disposed with the first opposing surface and the second opposing surface being perpendicular to each other.

8. A recording medium drive unit including a pickup device, wherein the pickup device comprises:

a fixed portion;

a movable portion holding an objective lens and adapted to move in at least one direction of a focus direction along an optical axis of a light beam incident on the objective lens and a tracking direction substantially orthogonal to the focus direction;

a linear resilient member with ends connected to the movable portion and the fixed portion;

a coil, wherein only one lateral side of the movable portion is attached to the coil; and a flux providing unit providing a magnetic flux that generates respective driving forces on a plurality of driven coil portions positioned away from a center of gravity of the movable portion, the directions of the driving forces being non-parallel and crossing with each other such that respective torques generated on the movable portion by driving the driven coil portions counteract one another;

wherein the plurality of driven coil portions are located on the same side of a plane passing through the center of gravity of the movable portion and extending, parallel to the one lateral side, in a direction in which the movable portion is driven; and wherein the flux providing unit includes:

a first magnet having a first pole and a second pole with different polarities, the first magnet facing the coil; and a yoke disposed adjacent to the first magnet, the yoke including: a first yoke portion in which a second pole thereof with a polarity opposite to the first pole of the first magnet is positioned close to the first pole of the first magnet opposing the coil; and a second yoke portion in which a first pole thereof with a polarity opposite to the second pole of the first magnet is positioned close to the second pole of the first magnet opposing the coil, wherein the first magnet has a first opposing surface facing the one lateral side of the movable portion and the yoke has a second opposing surface facing a side of the movable portion that is perpendicular to the one lateral side of the movable portion, and wherein the first magnet and the yoke are disposed with the first opposing surface and the second opposing surface being perpendicular to each other.

* * * * *